United States Patent [19]
Manning et al.

[11] Patent Number: 6,132,169
[45] Date of Patent: Oct. 17, 2000

[54] TURBINE AIRFOIL AND METHODS FOR AIRFOIL COOLING

[75] Inventors: Robert F. Manning, Newburyport; Robert B. Solda, Peabody; Lalit K. Parekh, Marblehead; Mohammad E. Taslim, Needham, all of Mass.

[73] Assignee: General Electric Company, Cincinnati, Ohio

[21] Appl. No.: 09/215,858

[22] Filed: Dec. 18, 1998

[51] Int. Cl.[7] .................................................. F01D 5/14
[52] U.S. Cl. ...................... 415/115; 415/116; 416/96 R; 416/96 A; 416/97 R
[58] Field of Search .................... 415/115, 116; 416/96 R, 96 A, 97 R

[56] References Cited

U.S. PATENT DOCUMENTS

| | | | |
|---|---|---|---|
| 3,369,792 | 2/1968 | Kraimer et al. | 416/97 R |
| 4,236,870 | 12/1980 | Hucul, Jr. et al. | 415/115 |
| 5,669,759 | 9/1997 | Beabout | 416/97 R |

*Primary Examiner*—Edward K. Look
*Assistant Examiner*—Hermes Rodriguez
*Attorney, Agent, or Firm*—Andrew C. Hess; Rodney M. Young

[57] ABSTRACT

A turbine engine airfoil includes a three-pass serpentine shaped cooling cavity including a leading edge chamber, an oversized intermediate chamber, and a trailing edge chamber in flow communication. The cavity further includes a combination of a plurality of ribs and a plurality of pins, a purge air swirler, a turning vane, and a metering partition which mixes the high pressure air and provides increased air cooling and uniform flow control in the airfoil. The metering partition provides a decrease of the air pressure in the trailing edge chamber allowing for an increase in the number of trailing edge slots.

20 Claims, 3 Drawing Sheets

TURBINE AIRFOIL AND METHODS FOR AIRFOIL COOLING

BACKGROUND OF THE INVENTION

This invention relates generally to turbine engines and, more particularly, to apparatus and methods for cooling an airfoil of a turbine engine.

A turbine engine typically includes a core engine having, in serial flow relationship, a high pressure compressor which compresses an airflow entering the core engine, a combustor in which a mixture of fuel and compressed air is burned to generate a propulsive gas flow, and a high pressure turbine which is rotated by the propulsive gas flow. The high pressure turbine may be connected to the high pressure compressor by a shaft so that the high pressure turbine drives the high pressure compressor. Additional compressors and turbines (e.g., a low pressure compressor and a low pressure turbine) may be positioned in serial flow relationship with the core engine. As used herein, the term "turbine" includes, without limitation, high pressure turbines and low pressure turbines Cooling of engine components, such as components of the high pressure turbine, is necessary due to thermal stress limitations of materials used in construction of such components. Typically, cooling air is extracted air from an outlet of the compressor and the cooling air is used to cool, for example, turbine airfoils. The cooling air, after cooling the turbine airfoils, re-enters the gas path downstream of the combustor.

Known turbine airfoils include cooling circuits through which cooling air flows for cooling the airfoil. More particularly, internal cavities within the airfoil define flow paths for directing the cooling air. Such cavities may define, for example, a serpentine shaped path having multiple passes (e.g., three or five passes). In general, a five-pass cooling circuit has an increased cooling effectiveness as compared to a three-pass cooling circuit.

Fabricating an airfoil having a five-pass cooling circuit, however, is more complex and expensive than fabricating, for example, an airfoil having a three-pass cooling circuit. More particularly, airfoils typically are fabricated using a die cast process. A casting core for a five-pass airfoil cooling circuit typically has a more complex shape, a smaller cavity dimensions, and is more fragile than a casting core for a three-pass airfoil cooling circuit.

In addition, during operation, the flow variation through a five-pass airfoil cooling circuit is greater than the flow variation through a three-pass airfoil cooling circuit due to higher airflow velocity, and an associated higher pressure loss, through the five-pass cooling circuit. Controlling air flow through a five-pass airfoil cooling circuit therefore is more difficult than controlling air flow through a three-pass cooling circuit. Until now, increased fabrication costs and decreased air flow control of a five-pass cooling circuit were trade-offs for increased cooling effectiveness.

Accordingly, it would be desirable to provide an airfoil having a cooling circuit which is less complex and less expensive to fabricate than a five-pass cooling circuit airfoil, yet has an increased cooling effectiveness as compared to known three pass cooling circuits.

BRIEF SUMMARY OF THE INVENTION

These and other objects may be attained by an airfoil having a three-pass serpentine shaped cooling circuit formed by a cavity with three cooling chambers connected in series, namely, a leading edge chamber, an oversized intermediate chamber, and a trailing edge chamber. The intermediate chamber includes an inlet turning vane for directing cooling air into the intermediate chamber, along with ribs or turbulators and a pin bank. A cross sectional area of the intermediate chamber is larger than a cross sectional area of the leading edge chamber and the trailing edge chamber. Such an increased cross sectional area of the intermediate chamber is sometimes referred to herein as an oversized chamber. The cross sectional area of the intermediate chamber also is larger than a cross sectional area of known five-pass cooling circuit chambers.

The increased cross sectional area of the intermediate chamber results in simplifying fabrication since a larger casting core can be utilized as compared to the size of the casting core of known five-pass cooling circuit airfoils. The inlet turning vane, along with the turbulators and pin bank, eliminate stagnant flow regions and enhance cooling effectiveness within the intermediate chamber.

The cooling circuit also includes a trailing edge flow metering partition which extends into the flowpath between the oversized intermediate chamber and the trailing edge chamber. The metering partition, in one embodiment, extends from an inner surface of an outer wall of the airfoil. This location for the metering partition is particularly advantageous because the casting core is strong and well supported at this location, e.g., due to the oversized intermediate chamber, and enables casting of the partition integral with the airfoil. Casting the metering partition integral with the airfoil is much less expensive than machining the partition.

In addition, such location of the metering partition enhances the effectiveness of an interstage or inter-turbine purge swirler which may be located at the inner diameter of the leading edge chamber and/or the intermediate chamber. The swirler directs air from the leading edge chamber to purge an inter-turbine cavity or interstage turbine rotor. Particularly, the swirler is more effective because the swirler may operate at a higher pressure ratio than if the metering were performed upstream from the swirler.

The above described airfoil is less costly to fabricate and has enhanced cooling air flow control as compared to known airfoils having five-pass cooling circuits. In addition, such an airfoil is believed to have an enhanced cooling effectiveness as compared to known airfoils having three-pass cooling circuits.

DETAILED DESCRIPTION OF THE INVENTION

Figure 1:
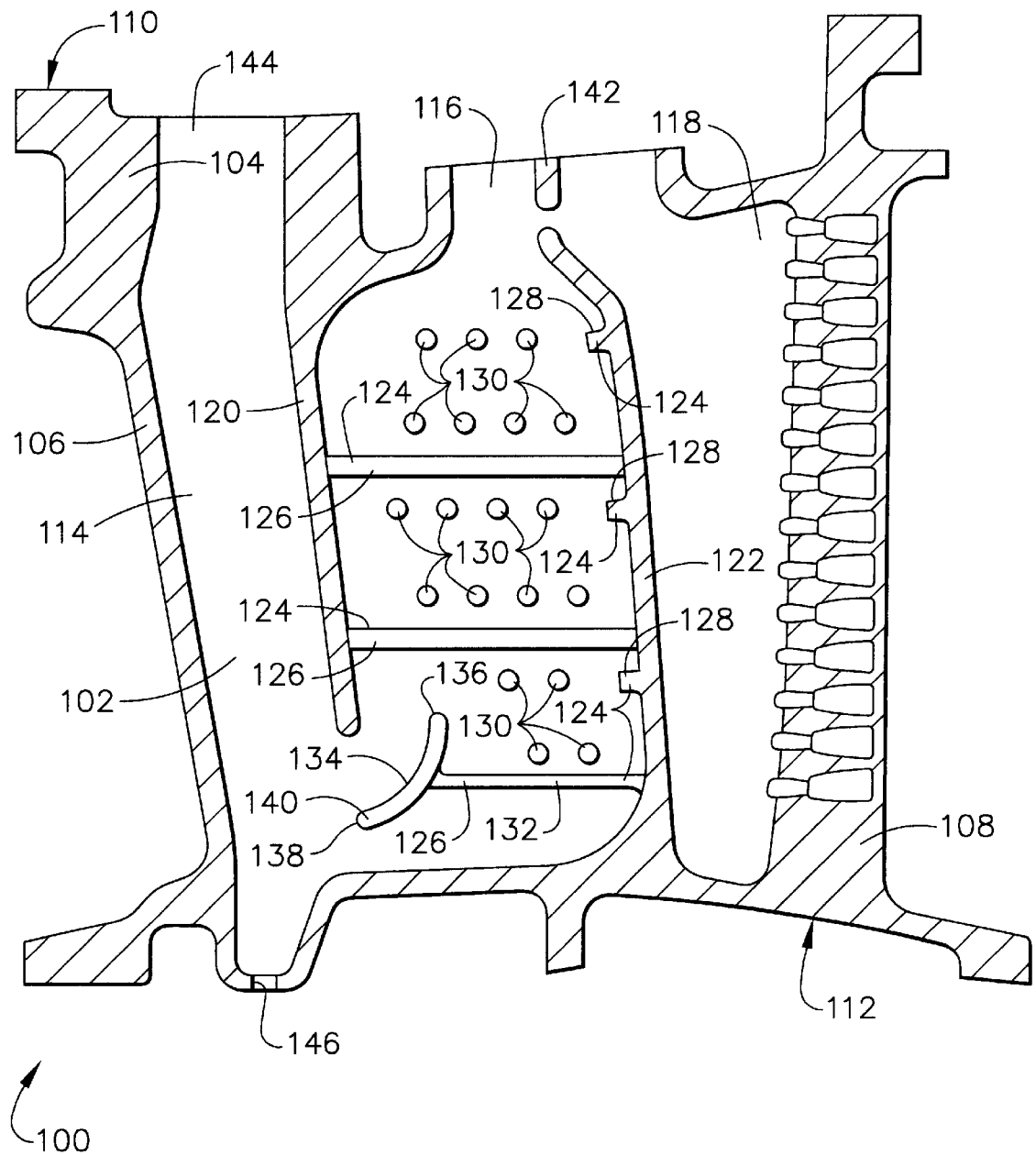
FIG. 1 is a schematic cross-sectional view of an airfoil in accordance with one embodiment of the present invention.

FIG. 1 illustrates a cross-section of an airfoil 100 for a turbine engine. Airfoil 100 may be utilized as a nozzle of a stator vane (not shown in FIG. 1) or a blade of a rotor (not shown). Airfoil 100 has a leading edge (not shown in FIG. 1) and a trailing edge (not shown in FIG. 1) which may come into contact with hot combustion gases and air.

Airfoil 100 includes a three-pass serpentine shaped cooling cavity 102 which is utilized to cool airfoil 100 with high pressure compressor air. Cavity 102 is formed by an inner wall 104 of airfoil 100. Inner wall 104 includes a leading end 106 and a trailing end 108 that correspond to the leading edge and the trailing edge of airfoil 100. Inner wall 104 also includes a concave portion (not shown in FIG. 1) and a convex portion (not shown in FIG. 1) that correspond to a concave wall (not shown) and a convex wall (not shown) of airfoil 100. Inner wall 104 further includes a top portion 110 and a bottom portion 112 that correspond to a top (not shown), and a bottom (not shown) of airfoil 100.

Cavity 102 is divided into three cooling chambers, a leading edge chamber 114, an intermediate chamber 116, and a trailing edge chamber 118. Intermediate chamber 116 has a larger cross-sectional area than leading edge chamber 114 and trailing edge chamber 118 and allows for a highly producible airfoil 100. Leading edge chamber 114 is in flow communication with intermediate chamber 116 and trailing edge chamber 118.

Leading edge chamber 114 is formed by leading end 106 of inner wall 104 and a first intermediate partition 120. Intermediate chamber 116 is formed by first intermediate partition 120 and a second intermediate partition 122, and trailing edge chamber 118 is formed by second intermediate partition 122 and trailing end 108 of inner wall 104. Intermediate chamber 116 further includes a plurality of ribs, or turbulators, 124. Ribs 124 extend from second intermediate partition 122 to first intermediate partition 120 and into cavity 102 of intermediate chamber 116. Turbulators 124, may have flat ends and may be commonly known as turbulent promoters or trip strips. Alternatively, turbulators 124 may have rounded ends.

A second plurality of ribs, or turbulators, 126 extend between second intermediate partition 122 and first intermediate partition 120 in intermediate chamber 116, and a fourth plurality of ribs, or turbulators, 128 are attached along second partition 122 and extend between the concave portion and the convex portion of intermediate chamber 116.

Intermediate chamber 116 includes a plurality of pins 130 that extend from the concave portion to the convex portion of inner wall 104. Alternatively, pins 130 may extend from either the concave portion or the convex portion and end within cavity 102. Pins 130 may extend from the concave portion and the convex portion in a staggered relationship, e.g., a first row of pins extends from the concave portion and an adjacent row of pins extends from the convex portion.

The geometry and interrelationship of intermediate chamber 116 to leading edge chamber 114 and trailing edge chamber 118, and pins 130 to turbulators 124 vary with the intended use of airfoil 100. However, a relationship between pins 130 and ribs 124 may be established.

Pins 130 are circular in nature and have a diameter that is proportional to the spacing between pins 130. Alternatively, pins 130 may have an oval shape or they may have another non-circular shape.

The ratio of the diameter of the pins 130 to the spacing of the pins 130 is between approximately 0.5 to approximately 0.1. For example, the spacing is about 2 to about 10 times larger than the diameter. Pins 130 are located in rows in intermediate chamber 116 and are separated from an adjacent row of pins 130 by turbulators or ribs 126. Turbulators 126 alternate from the concave portion to the convex portion of intermediate chamber 116, along a radial length of airfoil 100.

The height of turbulators 124 relative to the convex portion or the concave portion of intermediate chamber 116 is proportional to the distance between the concave portion and the convex portion of intermediate chamber 116. The ratio of the height of turbulators 124 to the distance between the convex portion and the concave portion of intermediate chamber 116 is between approximately 0.05 to approximately 0.5. For example, the distance between the concave portion and the convex portion of intermediate chamber 116 is about 20 to about 2 times larger than the height of turbulators 124.

The height of turbulators 124 is proportional to their width in intermediate chamber 116. The ratio of the height of turbulators 124 to the width of turbulators 124 is between approximately 0.5 to approximately 2. For example, the height of turbulators 124 is about ½ to about 2 times larger than the width of turbulators 124. The distance between turbulators 124 is also proportional to their height. The ratio of the distance between turbulators 124 to the height of turbulators 124 is between approximately 4 to approximately 20 times. Again by example, the distance between turbulators is about 4 to about 20 times larger than the height of turbulators 124.

The dimensions and distances of turbulators 124 are relative to their location. The dimensions and distances reflect the relationship of turbulators 124 along the concave portion to other turbulators 124 also along the concave portion or the relationship of turbulators 124 along the convex portion to other turbulators 124 also along the convex portion of inner wall 104.

A rib 132, is one of ribs 126 that connects to a turning vane 134. Rib 132 extends from second intermediate partition 122 towards first intermediate partition 120 and connects to turning vane 134 between a first end 136 and a second end 138. Turning vane 134 extends from the concave portion to the convex portion of intermediate chamber 116, and between first intermediate partition 120 and bottom portion 112 of inner wall 104. Second end 138 is located around a point 140. In alternative embodiments, turning vane 134 may rotate clockwise or counter-clockwise around point 140 and not connect with rib 132.

A metering partition 142 is cast into airfoil 100 and positioned between second intermediate partition 122 and top portion 110 of inner wall 104. Metering partition 142 controls the flow of compressed air from intermediate chamber 116 to trailing edge chamber 118. In an alternative embodiment, metering partition 142 may be cast into airfoil 100 and positioned between first intermediate partition 120 and bottom portion 112 of inner wall 104.

Airfoil 100 represents a stator vane (not shown), however the three-pass cooling cavity which is the subject of this invention may also be utilized in a rotor blade (not shown). Alternatively, turning vane 136 may extend from the concave portion or the convex portion of inner wall 104 and end in cavity 102.

Cavity 102 is fabricated by casting a core (not shown) into airfoil 100. The core is fabricated by injecting a liquid ceramic and graphite slurry into a core die (not shown). The slurry is heated to form a solid ceramic airfoil core. The airfoil core is suspended in an airfoil die (not shown) and hot wax is injected into the airfoil die to surround the ceramic airfoil core. The hot wax solidifies and forms an airfoil (not shown) with the ceramic core suspended in the airfoil.

The wax airfoil with the ceramic core is then dipped in a ceramic slurry and allowed to dry. This procedure is repeated several times such that a shell is formed over the wax airfoil. The wax is then melted out of the shell leaving a mold with a core suspended inside, and into which molten metal is poured. After the metal has solidified the shell is broken away and the core removed.

In operation, cooling air is supplied to airfoil 100 from a high pressure compressor (not shown) through a nozzle cooling air inlet 144. The cooling air then reaches bottom portion 112 of airfoil 100 and splits with approximately fifty percent of the cooling air exiting airfoil 100 through an opening 146. Opening 146, also referred to herein as interstage purge air swirler 146, is able to operate at a higher pressure ratio due to the location of metering partition 142 which is downstream of swirler 146. The remaining cooling air flows to intermediate chamber 116 with the assistance of turning vane 134.

Once the cooling air enters intermediate chamber 116 it comes in contact with a combination of ribs 124 and pins 130 that further agitate the air. Intermediate chamber 116 is large relative to conventional airfoil cooling cavities. The large size of intermediate chamber 116 results in a higher producible airfoil 100 since the casting core (not shown) is larger and less fragile than conventional airfoils.

A large cavity or chamber, however, inherently results in low cooling flow mach numbers and low heat transfer coefficients and cooling. The unique configuration of intermediate chamber 116 provides extremely high cooling effectiveness and uniform air flow for high pressure compressor air in cavity 102.

The cooling air then enters the trailing edge chamber 118 past metering partition 142. The location and use of metering partition 142 reduces the pressure of the cooling air flowing from intermediate chamber 116 past metering partition 142 and into trailing edge chamber 118. The reduced pressure in trailing edge chamber 118 enables producible cast trailing edge slot size. By placing metering partition 142 in airfoil 100 where the casting core is strong and well supported, metering partition 142 can be cast into airfoil 100.

Figure 2:
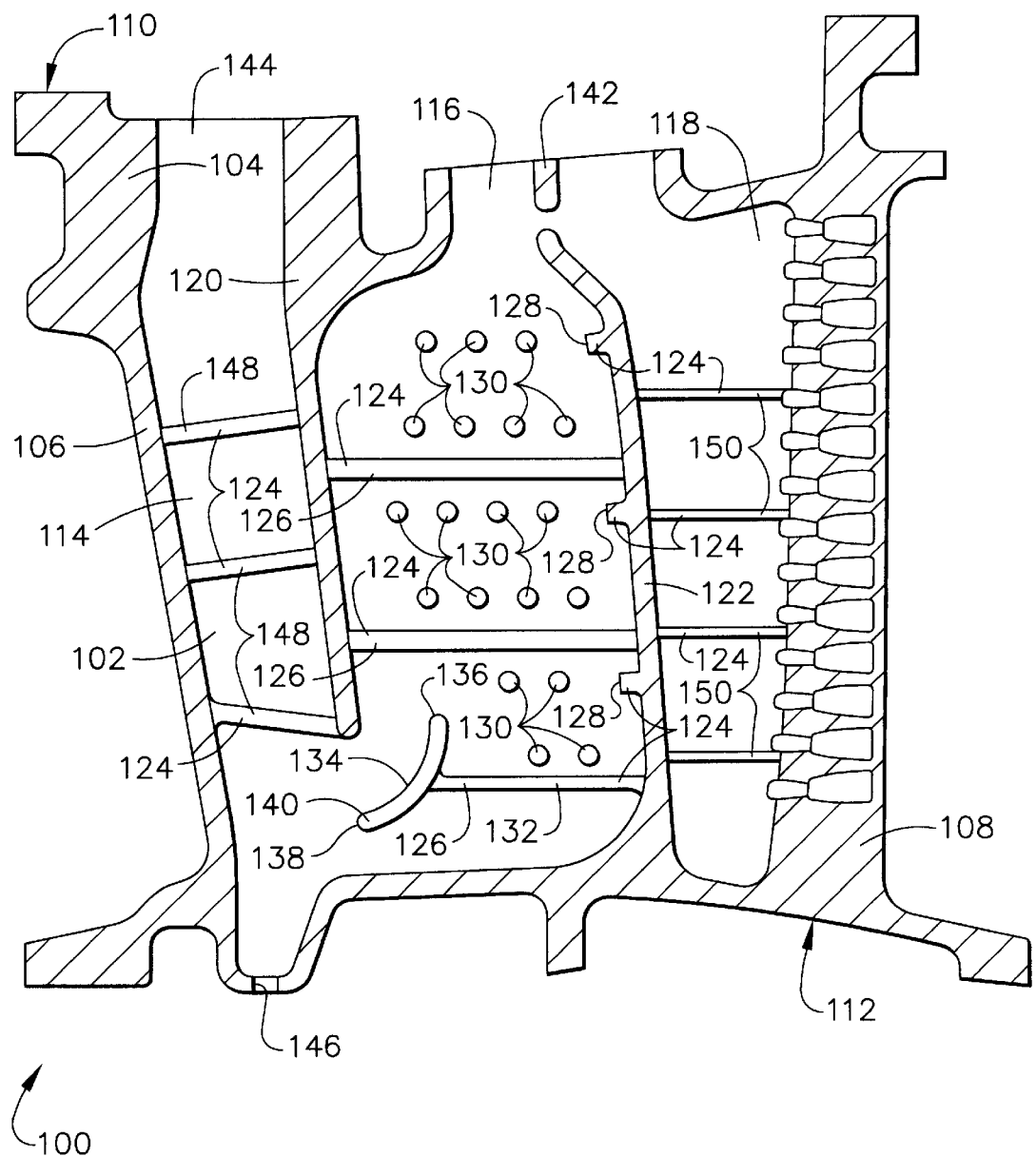
FIG. 2 is a schematic cross-sectional view of an airfoil in accordance with another embodiment of the present invention.

FIG. 2 has the same reference numerals has FIG. 1, except that some reference numerals are added because a leading edge chamber 114, an intermediate chamber 116, and a trailing edge chamber 118 contain a plurality of ribs 124.

A first plurality of ribs, or turbulators, 148 extend between leading end 106 of inner wall 104 and first intermediate partition 120 in leading edge chamber 114, and a third plurality of ribs, or turbulators 150 extend between trailing end 108 of inner wall 104 and second intermediate partition 122 in trailing edge chamber 118.

In operation of this embodiment of the present invention, cooling air enters airfoil 100 from a high pressure compressor (not shown) through nozzle air inlet 144 and flows radially inward through leading edge chamber 114 and around first plurality of ribs, or turbulators, 148. Turbulators 148 are also found on selective concave portions and convex portions of inner wall 104. Turbulators 148 prevent the cooling air from becoming fully developed channel flow and disrupt the boundry layer of the developing channel flow.

Once the air flow reaches trailing edge chamber 118 and passes metering partition 142 the pressure of the air is reduced. Ribs, or turbulators, 150 then aid in preventing the cooling air from achieving channel flow and also aid in the disruption of the boundary layer of any developing channel flow. Turbulators 148 and 150 represent the only difference between FIGS. 1 and 2 and the alternative embodiments of the present invention.

Figure 3:
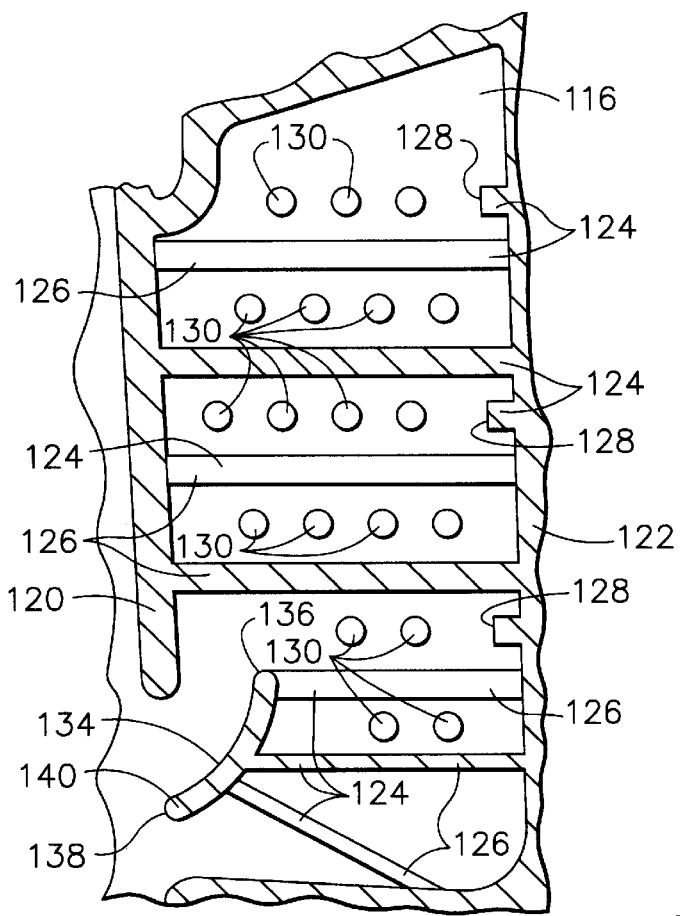
FIG. 3 is a schematic cross-sectional view of an intermediate chamber of the airfoil shown in FIG. 1 with ribs and pins illustrated.

FIG. 3 illustrates intermediate chamber 116 shown in FIG. 1 and has the same reference numerals has FIGS. 1 and 2. Ribs 126 extend from the concave portion and the convex portion of inner wall 104 and into cavity 102 of intermediate chamber 116. Ribs 126 extend between second intermediate partition 122 and first intermediate partition 120 in intermediate chamber 116. Ribs 126 also are attached along second intermediate partition 122 and extend between the concave portion and the convex portion of intermediate chamber 116.

Figure 4:
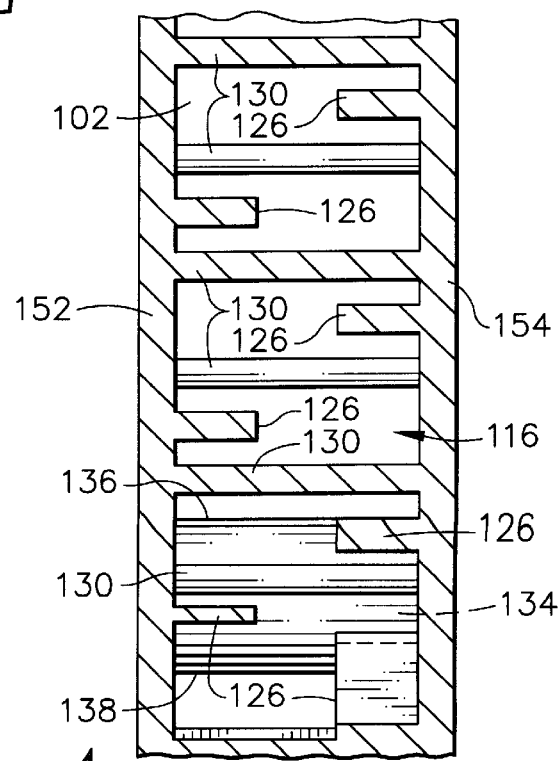
FIG. 4 is a cross-sectional view along line 4—4 of the intermediate chamber shown in FIG. 3.

FIG. 4 is a cross-sectional view of intermediate chamber 116 shown in FIG. 3 along line 4—4 and has the same reference numerals as FIGS. 1, 2, and 3 except that some reference numerals are added to illustrate a concave portion 152 and a convex portion 154 of inner wall 104 in intermediate chamber 116.

The geometry and interrelationship of intermediate chamber 116 to leading edge chamber (not shown in FIG. 4) and trailing edge chamber (not shown in FIG. 4), and pins 130 to turbulators 126 vary with the intended use. However, the relationship between pins 130 and ribs 126 is the same as established above.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An airfoil for a turbine engine, said airfoil comprising:
    an inner wall;
    at least one cooling cavity formed by said inner wall;
    a plurality of chambers formed by said inner wall in said cooling cavity, said chambers in flow communication, wherein at least one of said chambers has a larger cross-sectional area than other adjacent said chambers;
    a plurality of projections extending from said inner wall into said cooling cavity;
    a first intermediate partition; and
    a first plurality of ribs extending from said first intermediate partition.

2. An airfoil in accordance with claim 1 wherein said inner wall further comprises:
    a leading end and a trailing end;
    a second intermediate partition, said first intermediate partition positioned between said leading end and said trailing end, and said second intermediate partition positioned between said first intermediate partition and said trailing end;
    a concave portion and a convex portion, said concave portion separated from said convex portion by said cavity and joined to said convex portion at said leading end and at said trailing end; and
    a top portion and a bottom portion extending between said concave portion and said convex portion, said top portion and said bottom portion including an opening at said leading end.

3. An airfoil in accordance with claim 2 wherein said plurality of chambers further comprises:
    a leading edge chamber formed by said leading end and said first intermediate partition in said cooling cavity;
    an intermediate chamber formed by said first intermediate partition and said second intermediate partition; and
    a trailing edge chamber formed by said second intermediate partition and said trailing end.

4. An airfoil in accordance with claim 3 wherein said projections further comprises:

a second plurality of ribs extending between said second intermediate partition and said first intermediate partition from said concave portion and said convex portion of said inner wall, said first plurality of ribs extending between said first intermediate partition and said leading end from said concave portion and said convex portion of said inner wall;

a third plurality of ribs extending between said second intermediate partition and said trailing end of said inner wall from said concave portion and said convex portion of said inner wall;

a fourth plurality of ribs extending between said concave portion and said convex portion from said second intermediate partition; and a plurality of pins extending from said concave portion of said inner wall to said convex portion of said inner wall through said intermediate chamber.

5. An airfoil in accordance with claim 4 further comprising a metering partition cast into said inner wall.

6. An airfoil in accordance with claim 5 wherein said second plurality of ribs further comprises at least one rib extending from said second intermediate partition towards said first intermediate partition and connecting to a turning vane, said turning vane comprising a first end and a second end, said second end located around a point, said turning vane extending from said concave portion or said convex portion, between said bottom portion of said inner wall and said first intermediate wall, and into said cooling cavity.

7. An airfoil in accordance with claim 4 wherein said plurality of ribs are turbulators.

8. An airfoil in accordance with claim 6 wherein said metering partition is positioned between said second intermediate partition and said top portion of said inner wall, and separates said intermediate chamber from said trailing edge chamber.

9. A cooling system for an airfoil in a turbine engine, said system comprising:

a cooling cavity;

a leading edge chamber, an intermediate chamber, and a trailing edge chamber formed in said cavity, wherein said intermediate chamber is between said leading edge chamber and said trailing edge chamber and has a larger cross-sectional area than said leading edge and trailing edge chambers; and a plurality of pins and ribs extending into said cavity in said intermediate chamber.

10. A cooling system in accordance with claim 9 wherein said cooling cavity is formed by an inner wall comprising a leading end, a trailing end, a top portion, a bottom portion, a concave portion, a convex portion, a first intermediate partition and a second intermediate partition.

11. A cooling system in accordance with claim 10 wherein:

said leading edge chamber is formed by said leading end and said first intermediate partition;

said intermediate chamber is formed by said first intermediate partition and said second intermediate partition;

said trailing edge chamber is formed by said second intermediate partition and said trailing end;

said leading edge chamber is in flow communication with said intermediate chamber and said trailing edge chamber; and a metering partition reduces the flow between said intermediate chamber and said trailing edge chamber.

12. A cooling system in accordance with claim 11 wherein:

said pins extend from said concave portion to said convex portion;

said ribs connect said second intermediate partition to said first intermediate partition and extend from said concave portion and said convex portion into said cavity;

said ribs connect said concave portion to said convex portion and extend along said second intermediate partition;

said leading edge chamber comprises a plurality of openings; and a turning vane extends between said concave portion and said convex portion and extends between said first intermediate partition and said bottom portion.

13. A method for fabricating an airfoil for a turbine engine, said method comprising the steps of:

forming a cavity in the airfoil from an inner wall including a concave portion, a convex portion, a top portion, and a bottom portion, the concave portion joining the convex portion at a leading end and a trailing end;

dividing the cavity into a leading edge chamber, an intermediate chamber, and a trailing edge chamber, wherein the intermediate chamber has a larger cross-sectional area than the leading edge chamber and the trailing edge chamber; and extending a plurality of pins and a plurality of projections through the intermediate chamber, wherein the intermediate chamber is between the leading edge and trailing edge chambers.

14. A method in accordance with claim 13 wherein said step of dividing the cavity further comprises the steps of:

casting a first intermediate partition between the leading end and the trailing end of the inner wall; and casting a second intermediate partition between the first intermediate partition and the trailing end, the leading end and the first intermediate partition forming the leading edge chamber, the first intermediate partition and the second intermediate partition forming the intermediate chamber, the second intermediate partition and the trailing end of the inner wall forming the trailing edge chamber, and the intermediate chamber having a larger cross-sectional area than both the leading edge chamber and the trailing edge chamber.

15. A method in accordance with claim 13 further comprising the step of:

extending a plurality of projections through the leading edge chamber and the trailing edge chamber.

16. A method in accordance with claim 15 wherein said step of extending a plurality of projections further comprises the steps of connecting a plurality of ribs to the concave portion and the convex portion of the inner wall.

17. A method in accordance with claim 16 wherein said step of connecting a plurality of ribs further comprises the steps of:

extending a first plurality of ribs from the first intermediate partition to the leading end of the inner wall;

extending a second plurality of ribs from the second intermediate partition to the first intermediate partition;

extending a third plurality of ribs from the trailing end of the inner wall to the second intermediate partition; and extending a fourth plurality of ribs along the second intermediate partition.

18. A method in accordance with claim 17 wherein said step of extending a second plurality of ribs further comprises the steps of:

connecting one of said ribs to a turning vane; and extending the turning vane between the bottom portion of the inner wall and the first intermediate partition, towards the leading edge chamber.

19. A method in accordance with claim 15 wherein said step of extending a plurality of pins comprises the steps of:

connecting a plurality of pins to the concave portion of the inner wall; and connecting a plurality of pins to the convex portion of the inner wall.

20. A method in accordance with claim 15 wherein said step of directing compressed air through the cavity comprises the steps of:

forming an opening in the top portion of the leading end of the inner wall; and forming an opening in the bottom portion of the leading end of the inner wall.

* * * * *